United States Patent [19]

Okita et al.

[11] Patent Number: 4,619,868

[45] Date of Patent: Oct. 28, 1986

[54] MAGNETIC RECORDING MEDIUM

[75] Inventors: Tsutomu Okita, Kanagawa; Kyoichi Naruo, Shizuoka; Hiroshi Hashimoto, Kanagawa, all of Japan

[73] Assignee: Fuji Photo Film Co., Ltd., Kanagawa, Japan

[21] Appl. No.: 521,808

[22] Filed: Aug. 10, 1983

[30] Foreign Application Priority Data

Aug. 10, 1982 [JP] Japan ................................ 57-138980

[51] Int. Cl.$^4$ .............................................. G11B 5/70
[52] U.S. Cl. .................................. 428/425.1; 360/134; 360/135; 360/136; 252/62.54; 427/44; 427/128; 428/522; 428/694; 428/900
[58] Field of Search ............... 428/694, 695, 900, 522, 428/425.9; 427/44, 128; 360/134–136; 252/62.54

[56] References Cited

U.S. PATENT DOCUMENTS

| | | | |
|---|---|---|---|
| 4,407,853 | 10/1983 | Okita | 428/694 |
| 4,415,630 | 11/1983 | Kubota | 428/694 |
| 4,428,974 | 1/1984 | Okita | 427/44 |
| 4,443,490 | 4/1984 | Nakajima | 427/44 |
| 4,448,848 | 5/1984 | Okita | 428/447 |
| 4,560,616 | 12/1985 | Okita | 427/128 |
| 4,576,866 | 3/1986 | Okita | 427/44 |

*Primary Examiner*—Ellis P. Robinson
*Attorney, Agent, or Firm*—Sughrue, Mion, Zinn, Macpeak, and Seas

[57] ABSTRACT

A magnetic recording medium comprised of a support having a magnetic layer coated thereon is disclosed. The magnetic layer is comprised of a binder composition having a ferromagnetic powder dispersed therein. The binder composition is cured by an electron beam. The composition is comprised of 50 to 400 parts by weight of a compound having 2 or more acryloyl groups or methacryloyl groups in the molecule and 100 parts by weight of a mixture of 20 to 80 parts by weight of a thermoplastic resin having a thermal deformation temperature of 70° C. or more and 20 to 80 parts by weight of a rubber type resin. The material has excellent electromagnetic properties after repeated use. Further, the medium has high physical strength and excellent wear resistance.

7 Claims, No Drawings

MAGNETIC RECORDING MEDIUM

FIELD OF THE INVENTION

The present invention relates to magnetic recording media such as video tapes, audio tapes or computer tapes. More specifically, it relates to a magnetic recording medium having a magnetic layer cured by an electron beam.

BACKGROUND OF THE INVENTION

Binders which have been commonly used for magnetic recording media include thermoplastic resins such as vinyl chloride-vinyl acetate resins, vinyl chloride-vinylidene chloride resins, cellulose resins, acetal resins, urethane resins and acrylonitrilebutadiene resins used alone or in combination. However, with such binders the magnetic layer generally has poor wear resistance and the tape guiding systems which contact with magnetic tapes are stained during tape running.

Various improvements have been proposed where a thermosetting resin such as melamine resins or urea resins is used as a binder, or a binder which can be cross-linked by a chemical reaction such as an isocyanate compound or an epoxy compound is added to the abovedescribed thermoplastic resins. However, disadvantages occur when using such a cross-linking type binder. Firstly, the storage stability of the resin solution in which ferromagnetic particles are dispersed is low, i.e., the pot life is short and the physical properties of the resulting magnetic coating composition cannot be kept homogeneous, and accordingly, magnetic tapes cannot be uniformly prepared. Secondly, after coating and drying the magnetic coating composition, heat treatment is necessary to cure a coating layer thereby requiring a long period of time to manufacture magnetic recording media.

In order to eliminate the above disadvantages, a method has been proposed where a magnetic recording medium is prepared by using a combination of an acrylate oligomer and an acrylate type monomer as a binder and curing the binder by electron beam radiation after drying, as disclosed in Japanese Patent Publication No. 12423/72, Japanese Patent Application (OPI) Nos. 77433/75 and 25231/81 (the term "OPI" as used herein refers to a "published unexamined Japanese patent application"), U.S. Pat. Nos. 3,871,908 and 4,368,239, German Pat. No. 2,100,037 and Dutch Pat. No. 7,118,222. However, a magnetic recording medium having satisfactory physical properties and electric properties cannot be obtained in accordance with the above-described conventional methods.

In particular, the magnetic recording medium prepared by using a binder which can be cured by electron beam radiation or a binder mixture comprising a conventional thermoplastic resin and the above electron beam curing type resin and radiating the resulting magnetic coating composition with an electron beam as disclosed in U.S. Pat. No. 4,368,239 and Japanese Patent Application (OPI) No. 25231/81 shows poor durability when the medium is used at a high temperature or the medium generates heat after repeated runs (for example, when video recording tapes are used in a still mode of video tape recorders).

Recently, it has become necessary that a support for magnetic tapes be made thinner for long-time recording and that the physical strength of the magnetic layer be improved.

Further, as video cassette recorders have become to have multi-functions, video tapes used therefor are required to withstand use under severe conditions. However, it has hitherto been impossible to produce a magnetic recording medium having physical strength which satisfies the above requirements.

The inventors have attained the present invention as a result of extensive studies for improvements of conventional methods such as a method of using thermoplastic resins and thermosetting resins as disclosed in U.S. Pat. Nos. 3,634,137, 4,238,548 and 4,307,154, a method of adding a binder cross-linkable by a chemical reaction is disclosed in U.S. Pat. Nos. 4,333,988, 4,154,895 and 4,049,871, or a method of using a curable binder cured by electron beams, as disclosed in U.S. Pat. Nos. 3,871,908, 4,004,997 and 4,343,861.

SUMMARY OF THE INVENTION

A primary object of the present invention is to provide a magnetic recording medium having an excellent electromagnetic properties after repeated use.

Another object of the present invention is to provide a magnetic recording medium having a magnetic layer with high physical strength.

A further object of the present invention is to provide a magnetic recording medium coated with a magnetic coating composition which is stable and homogeneous during storage.

A still further object of the present invention is to provide a magnetic recording medium having excellent wear resistance.

A yet further object of the present invention is to provide a magnetic recording medium which is prepared without a heat treatment step which is usually necessary for curing a coated layer.

The above objects of the present invention can be attained with a magnetic recording medium comprising a support having coated thereon a magnetic layer comprised of, as a binder, a composition which can be cured by electron beam, said composition containing (1) 50 to 400 parts by weight of a compound having two or more acryloyl groups or methacryloyl groups in the molecule, and (2) 100 parts by weight of a resin mixture of 20 to 80 parts by weight of a thermoplastic resin having a thermal deformation temperature of 70° C. or more and 80 to 20 parts by weight of a rubber type resin.

DETAILED DESCRIPTION OF THE INVENTION

In accordance with the present invention, it has been surprisingly found that the durability of the magnetic layer at a high temperature and after repeated use as well as the wear resistance of the magnetic layer under normal use conditions can be markedly improved by using a combination of thermoplastic resin having a thermal deformation temperature of 70° C. or more, rubber type resin and electron beam curing type resin. Such improvements are believed due to the synergistic function of the heat resistance obtained from the thermoplastic resin, the wear resistance obtained from the rubber type resin and the durability due to cross-linked net structure formed by the compound having two or more acryloyl groups or methacryloyl groups.

Thermoplastic resins which can be used in the present invention which have a thermal deformation temperature of 70° C. or more include copolymers of vinyl chloride and vinyl acetate such as a vinyl chloride-vinyl acetate copolymer, a vinyl chloride-vinyl propionate copolymer, a vinyl chloride-vinyl acetate-vinyl alcohol copolymer, a vinyl chloride-vinyl acetate-maleic acid copolymer or a vinyl chloride-vinyl propionate-vinyl alcohol copolymer; cellulosic resins such as cellulose acetate, cellulose diacetate, cellulose triacetate, cellulose acetate butyrate, cellulose acetate nitrate or nitrocellulose; polycarbonates and polysulfones. Particularly preferred thermoplastic resins include a vinyl chloride-vinyl acetate-vinyl alcohol copolymer, a vinyl chloride-vinyl acetate-maleic acid copolymer and nitrocellulose. These polymers preferably have a modulus at 3% (stress at 3% elongation in tensile testing) of more than 3 kg/mm$^2$, more preferably more than 4.5 kg/mm$^2$.

The term "thermal deformation temperature" as used herein means the temperature at which a loaded needle starts to penetrate into a resin when tested by the penetration test with a thermal and mechanical analysis apparatus.

The thermal deformation temperature of typical thermoplastic resins is shown in the following Table 1. The thermal deformation temperature was measured by Thermal Mechanical System manufactured by Perkin Elmer Co.

TABLE 1

| Resin | Thermal Deformation Temperature (°C.) |
|---|---|
| Nitrocellulose | 180 |
| Vinyl chloride-vinyl acetate-vinyl alcohol copolymer | 80 |
| Vinyl chloride-vinyl acetate-maleic acid copolymer | 84 |
| Urethane resin | 5 |
| Polyvinyl acetate | 34 |

Examples of rubber type resins which can be used in the present invention include ester type urethane resins, either type urethane resins, copolymers of acrylonitrile-butadiene and copolymers of ethylene-vinyl acetate. A preferred rubber type resin is a urethane resin. These rubber type resins preferably have a modulus at 10% of less than 0.5 Kg/mm$^2$ and an elongation at break of more than 200%, more preferably more than 300%.

Examples of urethane resins which can be used in the present invention include polyester polyurethane resins obtained from a diisocyanate compound and a polyester polyol (prepared by reacting a dibasic acid such as phthalic acid, adipic acid, dimerized linoleic acid, maleic acid or the like with a polyhydric alcohol such as a glycol, for example, ethylene glycol, propylene glycol, butyrene glycol or diethylene glycol, trimethylolpropane, hexanetriol, glycerin, trimethylolethane, pentaerythritol or the like), and polyether polyurethanes obtained from a diisocyanate compound and a polyether polyol prepared by polymerization of propylene oxide, ethylene oxide and the like.

Examples of iisocyanate compounds useful for urethane formation are tolylene diisocyanate, 4,4'-diphenylenemethane diisocyanate, hexamethylene diisocyanate, meta-xylylene diisocyanate, cyclohexyl diisocyanate and the like.

Examples of compounds having two or more acryloyl groups or methacryloyl groups in the molecule include acrylates such as diethylene glycol diacrylate, triethylene glycol diacrylate, tetraethylene glycol diacrylate, trimethylolpropane triacrylate or pentaerythritol tetraacrylate; methacrylates such as diethylene glycol dimethacrylate, triethylene glycol trimethacrylate, tetraethylene glycol dimethacrylate, trimethylolpropane trimethacrylate or pentaerythritol tetramethacrylate; esters of polyols and acrylic acids or methacrylic acids; and compounds having two or more acryloyl groups or methacryloyl groups at the terminal groups of the main polymer chain or in the side chains thereof.

The compounds having acryloyl group or methacryloyl group at the terminal groups of the main chain or in the side chains thereof are referred to in A. Vrancken, *Fatipec Congress*, 11, 19 (1972). For example, these compounds can be shown by the following structure.

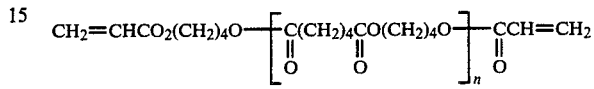

wherein n is an integer. The polyester skeleton of the above compounds can be a polyurethane skeleton, an epoxy resin skeleton, a polyether skeleton or a polycarbonate skeleton or a mixture thereof. The molecular weight is preferably in the range of from 1,000 to 20,000, but is not particularly limited.

Preferred examples of the compounds having two or more acryloyl groups or methacryloyl groups are diethylene glycol diacrylate, triethylene glycol diacrylate, tetraethylene glycol diacrylate, trimethylolpropane triacrylate, pentaerythritol tetraacrylate and the acrylate compound represented by the above formula.

The above-described compounds may be used alone or as a mixture thereof. Further, a compound having one carbon-carbon unsaturated bond in its molecule which can be polymerized by electron beams can also be added to the composition of the present invention.

Examples of compounds having one carbon-carbon unsaturated bond are acrylic acid, itaconic acid, methyl acrylate and homologues thereof such as alkyl acrylates, styrene and homologues thereof such as α-methylstyrene, β-chlorostyrene, etc., acrylonitrile, acrylamide, vinyl acetate, vinyl propionate, N-vinylpyrrolidone and the like. Other examples include compounds disclosed in "Kankosei Jushi Data-shu (A list of Data on Photosensitive Resins)", published by Sogo Kagaku Kenkyusho, December 1968, pp. 235–236.

The mixing ratio of the thermoplastic resin having a thermal deformation temperature of 70° C. or more and the rubber type resin is preferably 20:80 to 80:20 parts by weight, more preferably 40:80 to 60:20 parts by weight. If the proportion of the thermoplastic resin having a thermal deformation temperature of 70° C. or more is less than 20 parts by weight or if the proportion of the rubber type resin is less than 20 parts by weight, the durability of the resulting magnetic recording medium after repeated runs (for example, still mode durability) will be inferior.

A compound having two or more acryloyl groups or methacryloyl groups in the molecule is preferably used in an amount of 50 to 400 parts by weight, more preferably in an amount of 80 to 250 parts by weight, per 100 parts by weight of the mixture of the thermoplastic resin and the rubber type resin. If the compound is used at a proportion over the upper limit, an increased amount of electron beams is necessary for polymerization. If the compound is used at a proportion below the lower limit, cross-linking reaction does not occur sufficiently and thus sufficient durability of the resulting magnetic recording medium cannot be obtained.

The binder composition according to the present invention comprising a thermoplastic resin, a rubber type resin and a compound having two or more acryloyl groups or methacryloyl groups can be used in an amount of about 10 to about 50 parts by weight, preferably 15 to 35 parts by weight, per 100 parts by weight of the ferromagnetic powder.

Ferromagnetic powders used in the present invention include ferromagnetic iron oxide fine powders, Co-doped ferromagnetic iron oxide fine powders, ferromagnetic chromium dioxide fine powders, ferromagnetic alloy fine powders and barium ferrite. The acicular ratio of ferromagnetic iron oxide and chromium dioxide is 2/1 to 20/1, preferably more than 5/1. An average length of the ferromagnetic alloy powders is about 0.2 to 2.0 μm. The ferromagnetic alloy fine powders generally have a metal content more than 75 wt%, with more than 80 wt% of the metal content being a ferromagnetic metal (i.e., Fe, Co, Ni, Fe-Co, Fe-Ni, Co-Ni, Fe-Co-Ni), and has a longer diameter of less than about 1.0 μm.

Examples of organic solvents which can be used for the magnetic coating composition include ketones such as acetone, methyl ethyl ketone, methyl isobutyl ketone, cyclohexanone; esters such as methyl acetate, ethyl acetate, butyl acetate, ethyl lactate and monoethyl ether glycol acetate; glycol ethers such as diethyl ether, glycol dimethyl ether, glycol monoethyl ether and dioxane; aromatic hydrocarbons such as benzene, toluene and xylene; chlorinated hydrocarbons such as methylene chloride, ethylene chloride, carbon tetrachloride, chloroform, ethylene chlorohydrin and dichlorobenzene. The organic solvent can be used in an amount of about 400 to about 1,500 parts by weight, preferably 600 to 1,200 parts by weight, per 100 parts by weight of the resin composition.

Additives such as a lubricant, an abrasive, a dispersing agent, a rust preventing agent or an antistatic agent can be added to the magnetic coating composition of the present invention. Examples of lubricants are saturated or unsaturated higher fatty acids, fatty acid esters, higher fatty acid amides, higher alcohols, each containing 10 or more carbon atoms, preferably 12 or more carbon atoms, silicone oils, mineral oils, edible oils or fluoride type compounds. Examples of rust preventing agents are salicylanilide, tin oxide, mercury phenyloleate, copper naphthenate, zinc naphthenate, trichlorophenol, p-dinitrophenol, sorbic acid, butyl p-oxybenzoate, dihydroacetoacetic acid and the like. Some of these additives are disclosed in U.S. Pat. No. 4,135,016. These additives can be added when a coating composition is prepared, or can be coated or sprayed on a surface of a magnetic layer with or without an organic solvent after drying, smoothing the magnetic layer or curing the magnetic layer by electron beam radiation.

Materials for the support on which the magnetic coating composition is coated include polyesters such as polyethylene terephthalate or polyethylene-2,6-naphthalate; polyolefins such as polyethylene or polypropylene; cellulose derivatives such as cellulose triacetate; plastics such as polycarbonate, polyimide or polyamide-imide; non-magnetic metals such as aluminum, copper, tin, zinc or non-magnetic alloys including the above metals; and a kind of paper or a paper coated or laminated with polyolefins. Preferred examples of the supports include polyethylene tetrephthalate, polyethylene-2,6-naphthalate and polyimide films. The thickness of these supports can be generally in the range of about 5 to 100 μm, preferably 7 to 20 μm, but can vary widely over the above range depending upon the utility of magnetic recording media.

The non-magnetic support may be in the shape of a film, a tape, a sheet, a disc, a card or a drum, and various materials can be selected depending upon the above shape.

A backcoat can be provided on the support on the opposite side of the magnetic layer for the purpose of preventing charging, transferring, wow flutter, improving the strength of the magnetic recording medium and for making the back side of the support a matted layer.

A scanning method, a double scanning method, a curtain beam method or a broad beam curtain method can be used for accelerating electron beams.

The electron beam used has an accelerating voltage of 100 to 1,000 kv, preferably 150 to 300 kv. The absorption dose is 0.5 to 20 megarads, preferably 3 to 15 megarads. If the accelerating voltage is less than 100 kv, the transmitted amount of energy is insufficient and if the accelerating voltage is more than 1,000 kv, the energy efficiency used for polymerization is lowered making the process uneconomical. If the absorption dose is less than 0.5 megarad, the curing reaction is insufficient to obtain a magnetic layer having a satisfactory mechanical strength and if the absorption dose is more than 20 megarads, the energy efficiency used for curing reaction is lowered or a radiated object generates heat and the support, particularly a plastic support, may be deformed.

The present invention is further illustrated in greater detail by the following examples and comparative examples, but the present invention is not limited thereto. In examples and comparative examples, all parts are by weight unless otherwise indicated.

EXAMPLE 1

| | parts |
|---|---|
| γ-Fe$_2$O$_3$ | 400 |
| Nitrocellulose (RS½H, manufactured by Daicel Chemical Industries, Ltd.) | 50 |
| Urethane resin (a condensation product of adipic acid, butane diol and tolylene diisocyanate) | 15 |
| Ester acrylate oligomer "Aronix M6100", manufactured by Toagosei Chemical Industry Co., Ltd.) | 30 |
| Diethylene glycol diacrylate | 5 |
| Lecithin | 4 |
| Stearic acid | 4 |
| Butyl stearate | 4 |
| Methyl ethyl ketone | 1,000 |

The above composition was kneaded in a ball mill for 50 hours to obtain a magnetic coating composition, which was then coated by a doctor blade in a dry thickness of 5μ on a polyethylene terephthalate support having a thickness of 15μ. The coated layer was subjected to orientation with a cobalt magnet and the solvent was evaporated at 100° C. for 1 min. The coated layer was subjected to a smoothing treatment with calender rolls composed of five pairs of rolls, with each pair including a cotton roll and a mirror roll (a roll temperature: 60° C., pressure: 100 kg/cm$^2$). An electron beam with an accelerating voltage of 200 kv and a beam current of 10 mA was radiated so that the absorption dose was 10 Mrad. This sample was identified as Sample No. 1.

COMPARATIVE EXAMPLE 1

The same procedure as described in Example 1 was repeated except that the following composition was used as a binder instead of the binder components in the composition used in Example 1 and that the roll temperature of the calender treatment was 50° C. The resulting sample was identified as Sample No. 2.

|  | parts |
|---|---|
| Vinyl acetate | 65 |
| Ester acrylate oligomer (Aronix M6100) | 30 |
| Diethylene glycol diacrylate | 5 |

COMPARATIVE EXAMPLE 2

The same procedure as described in Example 1 was repeated except that the following binder composition was used instead of the binder components in the composition used in Example 1 and that the roll temperature of the calender treatment was 30° C. The resulting sample was identified as Sample No. 3.

|  | parts |
|---|---|
| Urethane resin | 65 |
| Ester acrylate oligomer (Aronix M6100) | 30 |
| Diethylene glycol diacrylate | 5 |

COMPARATIVE EXAMPLE 3

The same procedure as described in Example 1 was repeated except that the following binder composition was used instead of the binder components in the composition of Example 1 to prepare a magnetic recording medium. The resulting sample was identified as Sample No. 4.

|  | parts |
|---|---|
| Nitrocellulose (RS½H) | 65 |
| Ester acrylate oligomer (Aronix M6100) | 30 |
| Diethylene glycol diacrylate | 5 |

COMPARATIVE EXAMPLE 4

The same procedure as described in Example 1 was repeated except that the following binder composition was used instead of the binder components in the composition of Example 1 to prepare a magnetic recording medium. The resulting sample was identified as Sample No. 5.

|  | parts |
|---|---|
| Nitrocellulose (RS½H) | 65 |
| Urethane resin | 35 |

EXAMPLE 2

The same procedure as described in Example 1 was repeated except that the following binder composition was used instead of the binder components in the composition of Example 1 to prepare a magnetic recording medium. The resulting sample was identified as Sample No. 6.

|  | parts |
|---|---|
| Nitrocellulose (RS½H) | 50 |
| Urethane resin | 15 |
| Urethane acrylate oligomer (Aronix M1100) | 30 |
| Trimethylolpropane triacrylate | 5 |

Samples of Examples 1 and 2 and Comparative Examples 1 to 4 were run on a video tape recorder for 100 passes in order to measure their dynamic friction coefficient, time of durability at still mode and squareness ratios (residual flux density/maximum flux density). The results obtained are shown in Table 2.

TABLE 2

| Sample No. | Squareness Ratio | Dynamic Friction Coefficient after Repeated Use *1 | Time of Durability at Still Mode *2 (minutes) | Remarks |
|---|---|---|---|---|
| 1 | 0.83 | 0.20 | more than 60 | Invention |
| 2 | 0.63 | 0.50 | 15 | Comparative |
| 3 | 0.65 | The tape run stopped due to adhesion to a magnetic head. | 3 | Comparative |
| 4 | 0.75 | 0.50 | 10 | Comparative |
| 5 | 0.72 | The magnetic layer stripped out. | 1 | Comparative |
| 6 | 0.82 | 0.21 | more than 60 | Invention |

*1: Dynamic friction coefficient was indicated in terms of "$\mu$" value calculated by the following equation, using a VHS type video tape recorder (trade name: "Macroad 88" (NV-8200 type) manufactured by Matsushita Electric Industrial Co., Ltd.) at 40° C. and 65% relative humidity: $T_2/T_1 = e^{\mu\pi}$ where $T_1$ is a tape tension at the supply side of the rotary cylinder of VTR and $T_2$ is a tape tension at the take-up side of the rotary cylinder of VTR, whereby the effect of $T_1$ is removed from $T_2$ when $T_2$ is far larger than $T_1$. Running tension was evaluated in terms of $\mu$. Values indicated in Table 1 were obtained after 100 passes.
*2: The time durability at still mode was determined by recording predetermined video signals on video tapes (each samples) using a VHS type videotape recorder (trade name: "NV-8200 type" manufactured by Matsushita Electric Industrial Co., Ltd.), and measuring the period of time until the reproduced still images loose their clearness at 5° C. and 65% relative humidity.

As is apparent from the results shown in Table 2, the magnetic recording media prepared by using a mixture of a polymer having a thermal decomposition temperature of 70° C. or more, a rubber type resin and a compound having an acryloyl group as a binder composition and irradiating a magnetic layer with an electron beam according to the present invention (Sample Nos. 1 and 6) show markedly excellent electromagnetic properties, running properties and durability, etc., as compared with those of Comparative Examples 1 to 4 (Sample Nos. 2 to 5).

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support base having coated thereon a magnetic layer comprising a binder composition having a ferromagnetic powder dispersed therein, the binder composition being cured by an electron beam and comprising:
    50 to 400 parts by weight of a compound having 2 or more groups selected from the groups consisting of acryloyl groups and methacryloyl groups in the molecule; and
    100 parts by weight of a mixture consisting of 20 to 80 parts by weight of nitrocellulose having a thermal deformation temperature of 70° C. or more, and 20 to 80 parts by weight of a urethane resin, wherein said nitrocellulose has a modulus at 3% (stress at 3% elongation in tensile testing) of more than 3 kg/mm$^2$ and said urethane resin has a modulus at 10% of less than 0.5 kg/mm$^2$ and an elongation at break of more than 200%.

2. The magnetic recording medium as claimed in claim 1, wherein said nitrocellulose is present in an amount of 40 to 80 parts by weight and said urethane resin is present in an amount of 60 to 20 parts by weight.

3. The magnetic recording medium as claimed in claim 2, wherein said composition comprises 80 to 250 parts by weight of the compound having two or more acryloyl groups or methacryloyl groups in the molecule per 100 parts by weight of total amount of nitrocellulose and the urethane resin.

4. The magnetic recording medium as claimed in claim 3, wherein the compound having 2 or more groups selected from the groups consisting of acryloyl groups and methacryloyl groups in the molecule has a molecular weight in the range from 1,000 to 2,000.

5. The magnetic recording medium as claimed in claim 4, wherein the compound having 2 or more groups selected from the groups consisting of acryloyl groups and methacryloyl groups in the molecule is present in an amount in the range of 80 to 250 parts by weight per 100 parts by weight of the mixture of the nitrocellulose and the urethane resin.

6. The magnetic recording medium as claimed in claim 1, wherein the ferromagnetic powder is a ferromagnetic alloy powder having an average length per particle of 0.2 to 2.0 μm, the particles having a metal content of greater than 75 wt% wherein 80 wt% or more of the metal content is a ferromagnetic metal, the particles having a longer diameter of less than about 1.0 μm.

7. The magnetic recording medium as claimed in claim 1, wherein said binder composition is used in an amount of about 10 to about 50 parts by weight per 100 parts by weight of the ferromagnetic powder.

* * * * *